United States Patent [19]

Klamm

[11] Patent Number: 4,531,260
[45] Date of Patent: Jul. 30, 1985

[54] FISH FILLETING KIT

[76] Inventor: George F. Klamm, 8319 Caughdenoy Rd., Clay, N.Y. 13041

[21] Appl. No.: 511,520

[22] Filed: Jul. 7, 1983

[51] Int. Cl.³ .............................................. A22C 25/00
[52] U.S. Cl. .......................................... 17/70; 269/15
[58] Field of Search .......................... 17/66, 68, 69, 70; 269/15, 16, 289 R, 327

[56] References Cited

U.S. PATENT DOCUMENTS

| | | | |
|---|---|---|---|
| 1,315,101 | 9/1919 | Ehrke | 269/289 X |
| 1,743,763 | 1/1930 | Erickson | 269/15 X |
| 2,103,496 | 12/1937 | Saunders | 269/289 X |
| 3,713,188 | 1/1973 | Holladay | 17/70 |
| 3,713,189 | 1/1973 | Tkachuk | 17/70 |
| 4,253,650 | 3/1981 | Kuzio | 17/70 X |

Primary Examiner—Willie G. Abercrombie
Attorney, Agent, or Firm—Bruns and Wall

[57] ABSTRACT

An easily portable kit that opens to provide a good sized filleting board. The kit is comprised of a pair of substantially identical rectangular mating sections hinged together in end to end relation. When the sections are folded together they form a compact carrying case, and when unfolded they open out into an elongated work surface. Each section of the kit is formed with a recess that extends along one side of the work surface and this provides a convenient receptacle for the scraps that result from the filleting. One mating section is provided adjacent one end with an overlying bar, and this bar is adapted to positively engage a gill of the fish being filleted and securely hold the fish on the board.

6 Claims, 7 Drawing Figures

4,531,260

FISH FILLETING KIT

BACKGROUND OF THE INVENTION

This invention relates generally to fish dressing devices, and has particular reference to a novel fish filleting kit.

Heretofore, a number of devices have been developed to aid in cleaning, scaling and/or filleting fish which by their very nature are slippery and difficult to hold while being worked upon. Most of the pertinent prior art devices are cleaning or scaling boards such as are disclosed in U.S. Pat. Nos. 2,725,592; 2,795,814; 3,713,188; 3,785,008; 3,833,967 and 4,030,164. Three of these patents disclose boards having clamp means for holding the fish by its tail, and devices of this type are better adapted for scaling than for filleting.

In U.S. Pat. Nos. 3,713,188 and 3,833,967 both the head and tail of the fish are secured to the board by skewers, hooks or the like. U.S. Pat. No. 4,030,164 is specifically directed to a fish filleting device and, like the present invention, holds the fish at its head end only. This last-mentioned patent discloses a simple board having an arcuate opening adjacent one end, it being intended that a gill of the fish will be received in this opening whereby the fish will be retained on the board.

SUMMARY OF THE INVENTION

The present invention is directed to an easily portable kit that when closed provides a convenient receptacle for the tools used in the filleting process and when open provides a good sized filleting board. The kit is essentially comprised of a pair of substantially identical rectangular mating sections that are hinged together in end to end relation. When the sections are folded one upon the other they form a compact carrying case and when unfolded they open out into an elongated work surface. Each section of the kit is formed with a recess that extends along one side of the work surface and this provides a convenient receptacle for the scraps, etc. that result from the filleting.

One of the mating sections is provided adjacent one end with an overlying bar having limited up and down movement, and this bar is adapted to positively engage a gill of the fish being filleted and securely hold the fish on the board. This overlying bar provides a more secure holding action than the gill engaging means of U.S. Pat. No. 4,030,164 cited above. With further reference to the cited prior art patents, it should be noted that one of them, U.S. Pat. No. 3,713,188, discloses a kit type device; however, the patented kit differs from the present invention in its means for securing the fish to the work surface and in that it lacks a useful work area recess as well as other features to be described.

DESCRIPTION OF THE PREFERRED EMBODIMENT

Figure 1:
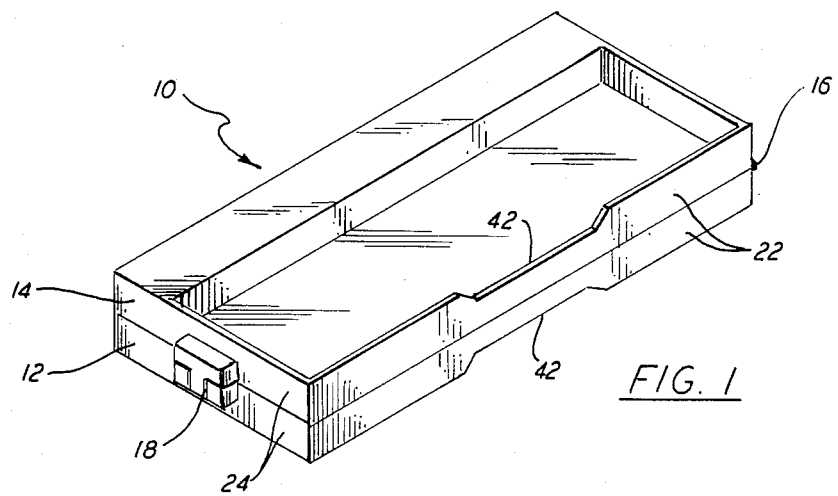
FIG. 1 is a perspective view of a fish filleting kit embodying the invention, the kit being shown in closed or carrying condition.
Figure 2:
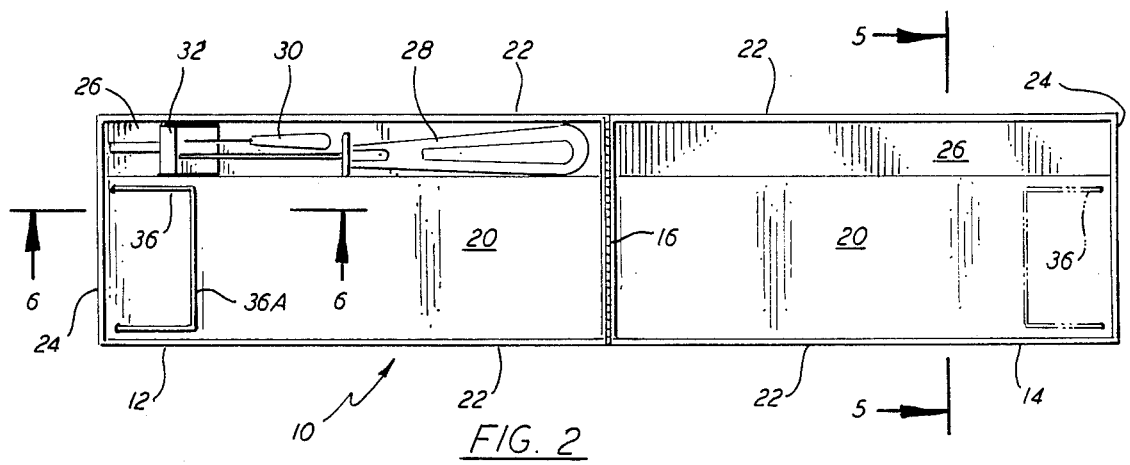
FIG. 2 is a top plan view of the kit of FIG. 1 shown in open condition.
Figure 3:
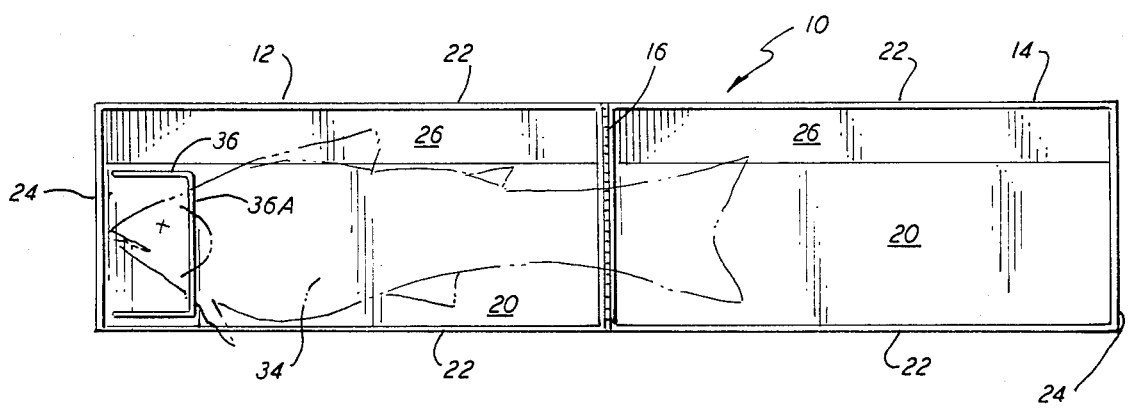
FIG. 3 is a view corresponding to FIG. 2 showing by phantom lines a fish positioned on the board for filleting.

Having reference now to the drawings, the filleting kit which is generally referenced at 10 is essentially comprised of a pair of substantially identical, rectangular mating sections 12 and 14 that are connected together in end to end relation by hinge means such as a conventional piano hinge 16, FIGS. 2 and 3. When the mating sections are folded one upon the other as shown in FIG. 1, and the free ends of the sections are releasably secured together by a suitable locking or latching means 18, the kit becomes a compact carrying case. When the sections 12,14 are unfolded they open out into an elongated work surface 20—20 described in more detail below.

The mating sections 12,14 are preferably injection molded plastic although it will be understood that they can be made of other materials such as hardwood with laminated Formica on the work surfaces, or solid hardwood. Each section includes a pair of narrow side walls 22 connected by a pair of narrow end walls 24. Near the upper edges of these walls (when the kit is open for use) there is a smooth, unbroken platform that serves as the work surface 20.

At one side of each mating section there is a recess 26, the recess being coextensive with the work surface 20 but considerably narrower in width. As shown in FIG. 2, one of the recesses 26 can be used for the storage of tools or articles used in the filleting process and in the illustrated embodiment of the invention an electric knife 28, a flexible filleting knife 30 and a scraping tool 32 are shown.

Figure 6:
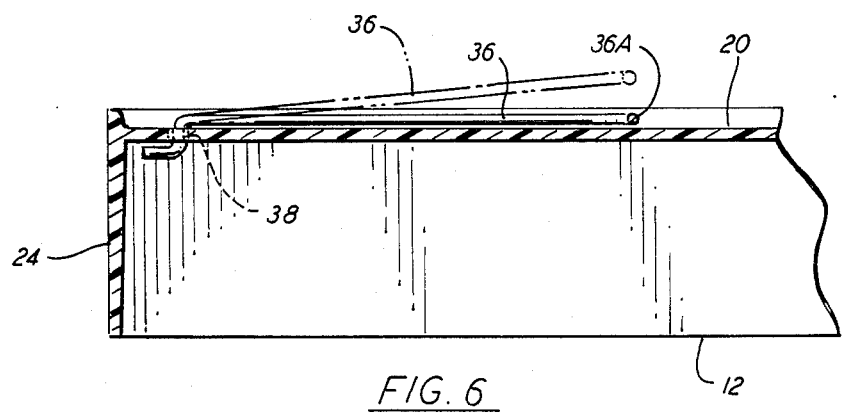
FIG. 6 is an enlarged, fragmentary longitudinal section taken on line 6—6 of FIG. 2.

The fish to be filleted, shown in phantom lines at 34, FIG. 3, is held in position on the work surface 20—20 by a generally U-shaped holding bar 36. As best shown in FIG. 6 the ends of this bar are offset and pass through holes 38 in the work surface whereby the side 36A of the bar can be raised above the work surface far enough to permit a gill of the fish to be passed beneath and wedged against it as indicated in FIG. 3. The holding bar can be located at either end of the work surface 20—20 as shown by phantom lines in FIG. 2.

Figure 5:
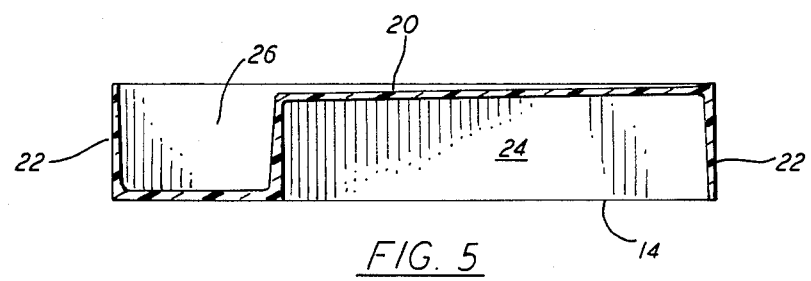
FIG. 5 is an enlarged transverse section through the kit taken on line 5—5 of FIG. 2.

When the fish is to be filleted it is placed on the work surface and its gill engaged with the holding bar as above described. At this point the tools are removed from the recess 26 and that latter can be used as a convenient receptacle for scraps and other waste materials that result from the filleting. In this connection, it may be seen from FIG. 5 that the work surface 20 has a slight incline so that it slopes toward the recess 26.

Figure 4:
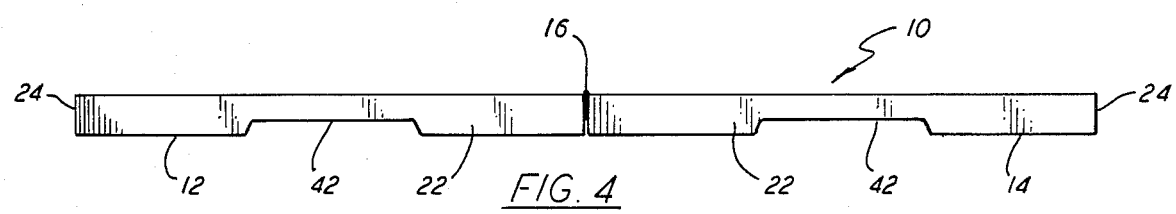
FIG. 4 is a side elevation of the kit shown in FIG. 2.
Figure 7:
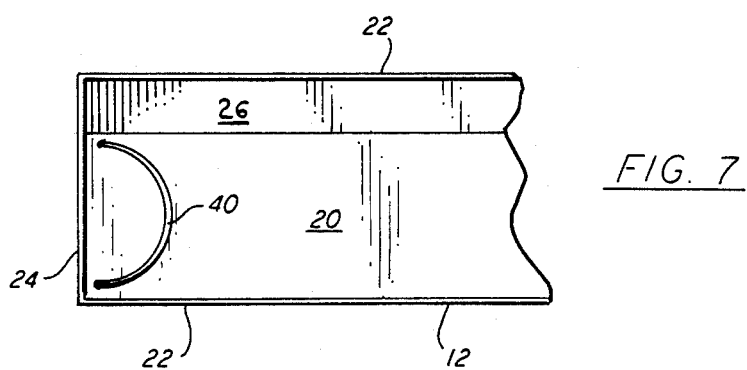
FIG. 7 is a fragmentary top plan view corresponding to the left end of FIG. 3 but showing a modified form of the fish holding bar.

FIG. 7 illustrates a holding bar 40 of another configuration, the bar having a semicircular shape. The bar 40 is secured to the work surface 20 in the same manner as holding bar 36, FIG. 6. As best shown in FIGS. 1 and 4, each mating section 12 and 14 is formed with a narrowed portion 42 in one of its side walls 22. These facilitate folding the sections together, FIG. 4, and provide a convenient hand grip area when the kit is closed, FIG. 1.

From the foregoing description it will be apparent that the invention provides a novel and very advantageous fish filleting kit. As will be understood by those familiar with the art, the invention may be embodied in other specific forms without departing from the spirit or essential characteristics thereof.

I claim:

1. In a fish filleting kit having a pair of substantially identical mating sections that are permanently hinged together so that when folded one upon the other they form a compact, portable carrying case and when unfolded they open out to jointly form an elongated work surface, wherein the improvement consists of each mating section having an elongated planar work surface in its open condition and an elongated recess for receiving waste material that is coextensive with one side of the work surface, the width of the work surface being substantially greater than that of the recess, and a unitary retaining bar overlying the work surface of one of the mating sections, the bar being engageable with a gill of the fish being filleted.

2. A fish filleting kit as defined in claim 1 wherein the retaining bar is connected to the work surface for limited movement relative thereto.

3. A fish filleting kit as defined in claim 1 wherein the work surface in each section slopes downwardly toward its adjacent recess.

4. In a fish filleting kit having a pair of substantially identical rectangular mating sections that are permanently hinged together in end to end relation so that when folded one upon the other they form a compact, portable carrying case in which filleting tools may be stored and when unfolded they open out to jointly form an elongated work surface, wherein the improvement consists of each mating section having an elongated planar work surface and a contiguous elongated storage and waste material recess that is coextensive with one side of the work surface, the width of the work surface being substantially greater than that of the recess, the work surface being inclined with respect to the horizontal whereby it slopes downwardly towards the recess, and a fish retaining bar connected to and overlying the work surface of one of the mating sections, the retaining bar being engageable with a gill of the fish being filleted.

5. A fish filleting kit as defined in claim 4 wherein the retaining bar is generally U-shaped.

6. A fish filleting kit as defined in claim 4 wherein the retaining bar is generally semicircular in shape.

* * * * *